United States Patent [19]

Rosthauser et al.

[11] Patent Number: 5,783,652

[45] Date of Patent: Jul. 21, 1998

[54] REACTIVITY IMPROVEMENT OF URETHANE PREPOLYMERS OF ALLOPHANATE-MODIFIED DIPHENYLMETHANE DIISOCYANATES

[75] Inventors: James W. Rosthauser, Pittsburgh, Pa.; William E. Slack, Moundsville, W. Va.

[73] Assignee: Bayer Corporation, Pittsburgh, Pa.

[21] Appl. No.: 963,738

[22] Filed: Nov. 4, 1997

[51] Int. Cl.$^6$ .................................................. C08G 18/10
[52] U.S. Cl. ...................... 528/48; 252/182.22; 528/59; 528/73; 528/74.5; 524/774
[58] Field of Search .................. 252/182.22; 528/73, 528/59, 48, 74.5; 524/774

[56] References Cited

U.S. PATENT DOCUMENTS

| | | | |
|---|---|---|---|
| 3,155,699 | 11/1964 | Powers | 260/453 |
| 3,793,362 | 2/1974 | Kolakowski et al. | 260/453 SP |
| 3,925,437 | 12/1975 | Rowton | 260/453 SP |
| 3,969,288 | 7/1976 | Cenker et al. | 260/2.5 BF |
| 4,118,286 | 10/1978 | Burns et al. | 203/89 |
| 4,310,688 | 1/1982 | Mendoza | 560/222 |
| 4,661,627 | 4/1987 | Regelman | 560/352 |
| 4,738,991 | 4/1988 | Narayan | 521/124 |

*Primary Examiner*—Rachel Gorr
*Attorney, Agent, or Firm*—Joseph C. Gil; N. Denise Brown

[57] ABSTRACT

This invention relates to mixtures of urethane prepolymers of allophanate-modified diphenylmethane diisocyanates with epoxides. The addition of the epoxide increases the reactivity of these prepolymers. It is now possible to form polyurethanes from these mixtures based on prepolymers of diphenylmethane diisocyanates wherein less catalyst is necessary.

11 Claims, 2 Drawing Sheets

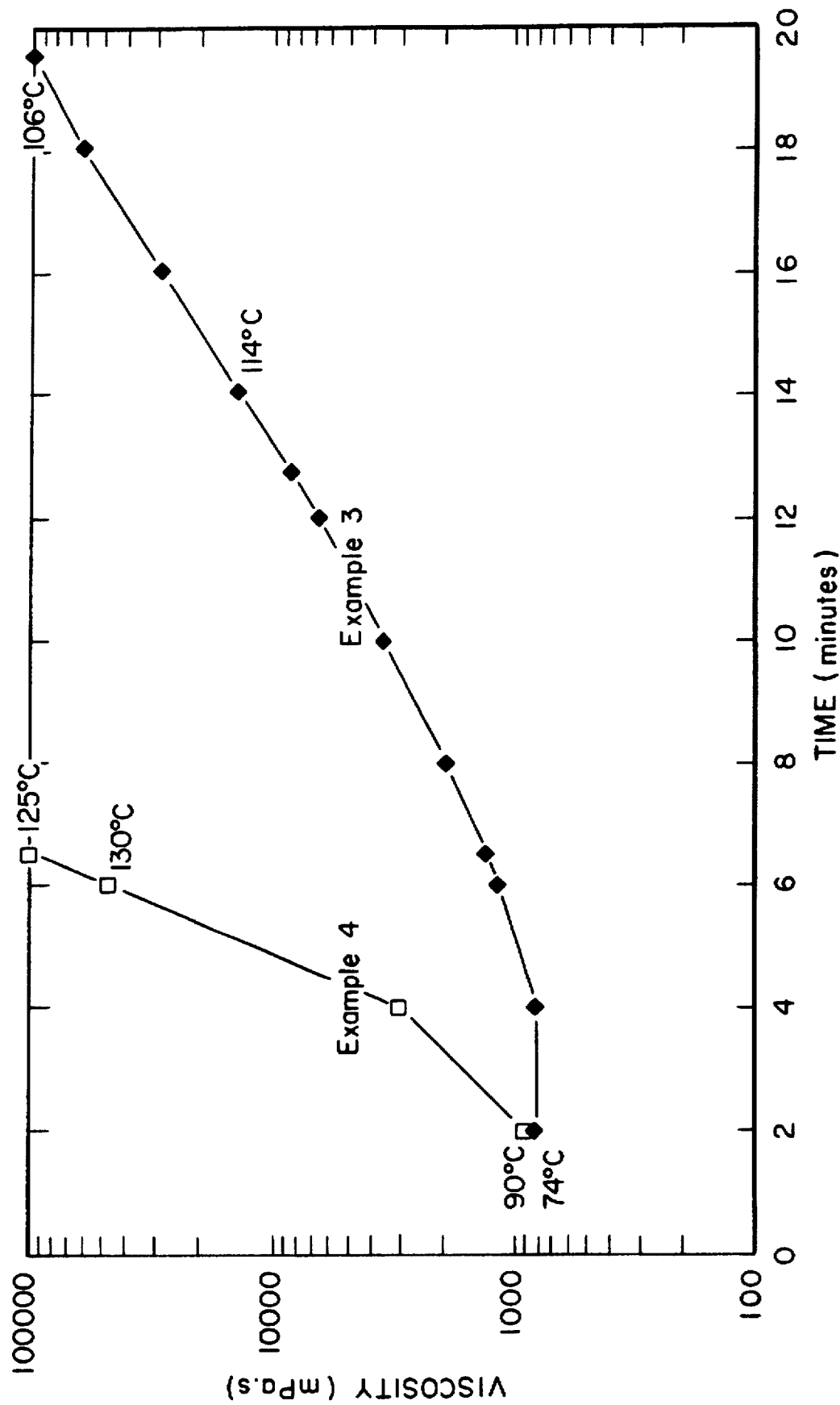

REACTIVITY IMPROVEMENT OF URETHANE PREPOLYMERS OF ALLOPHANATE-MODIFIED DIPHENYLMETHANE DIISOCYANATES

BACKGROUND OF THE INVENTION

This invention relates to increasing the reactivity by lowering the acidity of urethane modified, allophanate modified MDI monomers by the addition of epoxides. The present invention also relates to a process for producing polyurethanes/ureas by reacting these lower acidity materials with isocyanate-reactive components, which requires less catalyst for the reaction than conventional urethane modified, allophanate modified MDI monomers.

A number of patents describe the use of epoxides to reduce the acidity of isocyanates. For example, U.S. Pat. 3,925,437 describes the addition of a lower alkylene oxide compound to a methylene-bridged polyphenyl polyisocyanate mixture whereby the acidity of the isocyanate mixture is greatly reduced, resulting in increased reactivity in the production of polyurethane and polyisocyanurate foams and elastomers.

In the case of methylene-bridged polyphenyl polyisocyanate mixtures, the acidity is a by-product of the process by which they are made and, therefore, reduction of the acidity has no negative effect on the stability of the isocyanate.

In the case of the allophanate of MDI monomer, a catalyst is required for the conversion of the urethane to the allophanate. In order to have a stable product, the catalyst must be neutralized or stopped. This is accomplished by the addition of acidic compounds. For example, U.S. Pat. 4,738,991 discloses organic polyisocyanates characterized by allophanate linkages which are prepared by reacting an organic polyisocyanate including 2,4- and 4,4-diphenylmethane diisocyanate with poly- or monohydric alcohol in the presence of an organic metallic catalyst. The catalyst is then deactivated or stopped using a compound such as an inorganic acid, an organic acid, an organic chloroformate, or an organic acid chloride.

According to the present invention, it is now possible to reduce the apparent acidity of the urethane modified, allophanate modified MDI prepolymer by the addition of an epoxide without causing stability problems. These products, which have lower apparent acidity, show increased reactivity towards isocyanate-reactive components. This makes it possible to use a smaller quantity of catalyst, which in turn, reduces the cost of using these prepolymers in polyurethane formulations.

Furthermore, it is surprising that only the urethane prepolymers of the allophanate modified MDI is storage stable. This was unexpected since the allophanate modified MDI is not storage stable.

SUMMARY OF THE INVENTION

This invention relates to a mixture of A) 90 to 99.5%, preferably 95% to 99.5%, more preferably 97% to 99% by weight, most preferably 98% to 99% by weight, based on 100% by weight of the mixture, of a stable, liquid prepolymer of an allophanate modified MDI, and B) 0.5 to 10%, preferably 0.5% to 5%, more preferably 1% to 3% by weight, most preferably 1% to 2% by weight based on the entire weight of the mixture, of one or more epoxides having an epoxide equivalent weight of about 44 to about 400. The stable, liquid prepolymer of the allophanate-modified MDI has an NCO group content of from about 5% to about 30%, preferably about 10 to 29%.

The present invention also relates to a process for producing polyurethanes/ureas by reacting these 1) mixtures of A) a stable, liquid prepolymer of an allophanate-modified diphenylmethane diisocyanate, and B) epoxides; with 2) isocyanate-reactive components.

These mixtures of A) a stable, liquid urethane prepolymer of an allophanate-modified diphenylmethane diisocyanate, with B) one or more epoxides exhibit faster reactivity profiles while having good storage stability relative to the NCO content and viscosity at normal storage temperature of 25° to 50° C. It is preferred that these mixtures are storage stable for at least about 3 months at 25° C. In contrast, when the allophanate-modified MDI is treated in the same way with an epoxide, the expected increase in reactivity is observed when reacted with isocyanate-reactive components, however, the treated allophanate-modified MDI is not stable relative to the NCO content and viscosity at normal storage temperatures of 25° to 50° C.

BRIEF DESCRIPTION OF THE DRAWINGS

FIG. 2 is a graph showing a plot of the increases of viscosity versus time of allophanate-modified MDI with and without the addition of an epoxide, with a polyester.

DETAILED DESCRIPTION OF THE INVENTION

Figure 1:
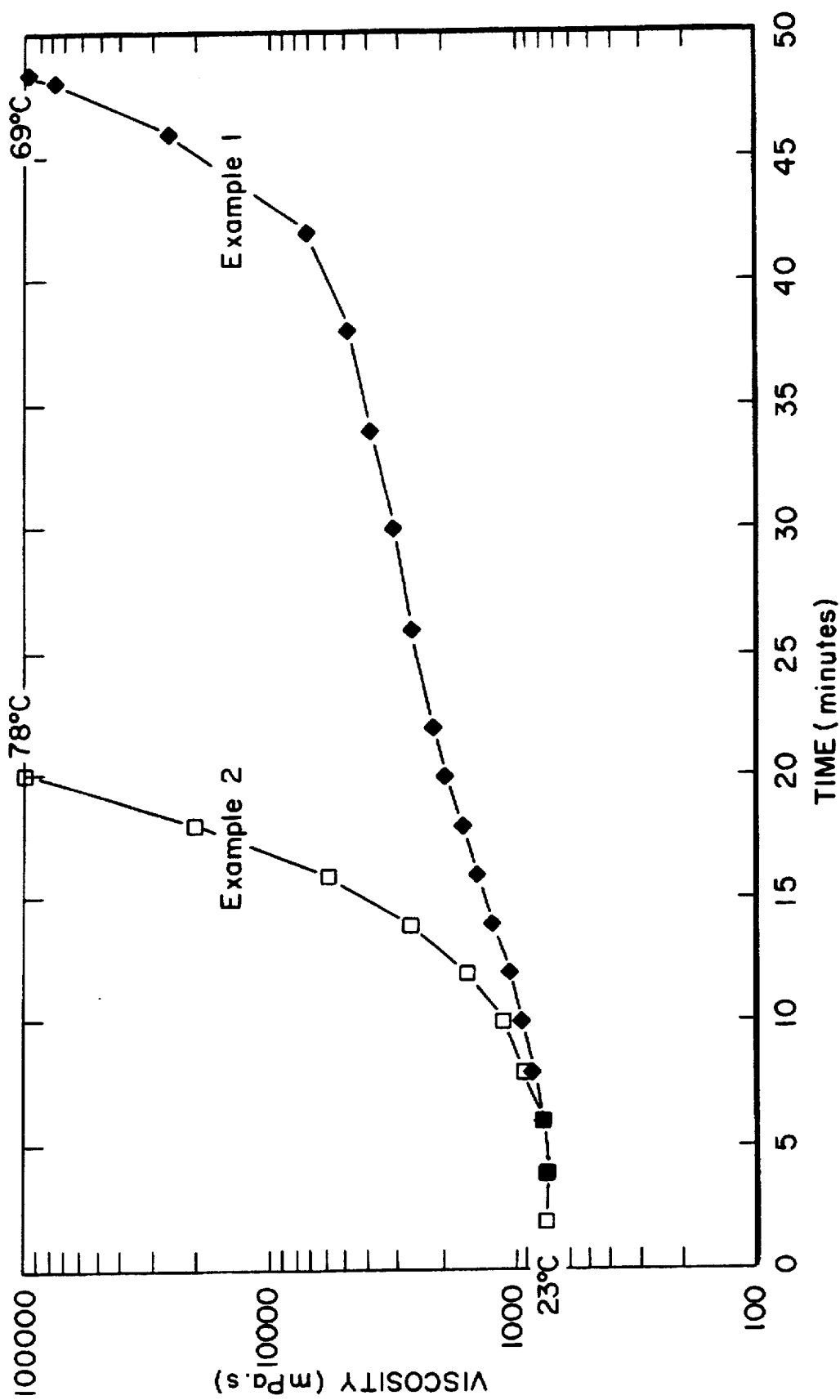
FIG. 1 is a graph showing a plot of the increases in viscosity versus time of allophanate-modified MDI prepolymers with and without the addition of an epoxide, with a polyol.

Suitable A) stable, liquid isocyanate prepolymers of allophanate-modified MDI for the presently claimed invention are those prepolymers having an NCO content of 5 to 30%, preferably 10 to 29%. Suitable prepolymers of allophanate-modified MDI comprise the reaction product of A)1) an allophanate-modified MDI having an NCO content of 12 to 32.5%, and A)2) an organic compound containing from two to six hydroxyl groups, and having a molecular weight of from 76 to 6,000. Preferred organic compounds are polyether polyols containing from 2 to 3 hydroxyl groups and having a molecular weight of from 400 to 5,000.

Allophanate-modified MDI, component A)1), for the present invention, is prepared by reacting: a) an aliphatic alcohol, an aliphatic diol, an aliphatic triol, an aromatic alcohol, an aromatic diol or mixtures thereof, with b) diphenylmethane diisocyanate comprising (i) about 0 to 60% by weight of 2,4'-diphenylmethane diisocyanate, (ii) less than 6% by weight of 2,2'-diphenylmethane diisocyanate, and (iii) the balance being 4,4'-diphenylmethane diisocyanate, with the percents by weight totalling 100%. The allophanate-modified MDI is preferably made from a) an aliphatic alcohol or diol, having a molecular weight of 32 to 300.

These stable, liquid prepolymers of allophanate-modified MDI are described in, for example, U.S. Pat. 5,319,053, the disclosure of which is herein incorporated by reference. A suitable process for the preparation of these allophanate-modified MDI prepolymers is also included therein.

Any chemical compound which contains the epoxide (oxirane) functionality is suitable in the preparation of the mixtures of the present invention. The term "epoxide" or "epoxy" as used herein refers to any organic compound or resin comprising at least one group comprising a three membered oxirane ring. Preferably, two or more oxirane groups are present in the epoxide compound or resin in order to obtain the polyisocyanate compositions with consistent reactivity profiles of the instant invention. The epoxide equivalent weight (EEW) range of suitable epoxides is from about 44 to 400, preferably 100 to 350 and most preferably 150 to 300. Both aliphatic mono- and polyepoxides may be used, and are well known.

It is somewhat less preferred that the epoxy contains an aromatic group due to the tendency of them to cause yellowing as well as their reduced efficacy. Examples of such aromatic group containing polyepoxides include but are not limited to those selected from the group consisting of the polyglycidyl ethers of polyhydric phenols; glycidyl esters of aromatic carboxylic acids; N-glycidylaminoaromatics such as N-glycidylaminobenzene, N,N,N',N'-tetraglycidyl-4,4'-bis-aminophenyl methane, and diglycidylaminobenzene; glycidylaminoglycidyloxy-aromatics such as glycidylaminoglycidyloxybenzene; and mixtures thereof.

The aromatic group containing polyepoxide resins, comprised of the polyglycidyl-ethers of polyhydric phenols including bis(phenol A), are also less preferred because they contain hydroxyl groups and thus, react with the polyisocyanate mixtures. Thus, this reduces the isocyanate content. Also, less preferred are aliphatic epoxides containing hydroxyl groups, e.g., glycidol, for the same reason. The preferred epoxides for use according to the invention are the aliphatic epoxides which do not contain hydroxyl groups.

Suitable for use are $C_2$–$C_{10}$ aliphatic epoxides such as, for example, ethylene oxide, propylene oxide, 1,2-butene oxide, 2,3butene oxide (cis and/or trans), isobutylene oxide, 1,2-pentene oxide, 2,3-pentene oxide, cyclopentene oxide, 1,2-hexene oxide, cyclohexene oxide, and the like and mixtures thereof.

Examples of useful aliphatic polyepoxides include but are not limited to those selected from the group consisting of vinyl cyclohexene dioxide; butadiene dioxide; and those containing ether linkages such as triglycidyl isocyanurate, triglycidyl pentaerythritol, tetraglycidyl pentaerythritol, diglycidylethers of cyclohexane dimethanol and the diglycidylethers of other diols known to those skilled in the art, 1,4-bis(2,3-epoxypropoxy)-benzene; 1,3-bis(2,3-epoxypropoxy)benzene; 4,4'-bis(2,3-epoxypropoxy) diphenyl ether; 1,8-bis(2,3-epoxypropoxy)octane; 1,4-bis(2,3-epoxypropoxy) cyclohexane; 4,4'-(2-hydroxy-3,4-epoxybutoxy)-diphenyl dimethyl methane; 1,3-bis(4,5-epoxypentoxy)-5-chlorobenzene; 1,4-bis(3,4-epoxybutoxy)-2-chlorocyclohexane; diglycidyl thioether; diglycidyl ether; 1,2,5,6-diepoxyhexane-3; 1,2,5,6-diepoxyhexane; those containing ester groups such as ERL 4221, a product of Union Carbide Corporation, illustrated in U.S. Pat. 4,814,103, the disclosure of which is herein incorporated by reference, and mixtures thereof.

Other useful epoxides are listed in, for example, U.S. Pat. 3,298,998, the disclosure of which is herein incorporated by reference. These compounds include but are not limited to those selected from the group consisting of bis[p-(2,3-epoxypropoxy)phenyl]cyclohexane; 2,2-bis[p-(2,3-epoxypropoxy)phenyl]norcamphane; 5,5-bis[(2,3-epoxypropoxy) phenyl]hexahydro-4,6-methanoindane; 2,2-bis[4-(2,3-epoxypropoxy)-3-methylphenyl]hexahydro4,7-methanoindane; and 2-bis[p-2,3-epoxypropoxy) phenyl]-methylene-3-methylnorcamphane; and mixtures thereof. Other usable epoxides are found in, for example, Handbook of Epoxy Resin, Lee and Neville, McGraw-Hill, N.Y. (1967) and U.S. Pat. 3,018,262, both of which are herein incorporated by reference.

Also, suitable epoxides for use in the present invention include the epoxidized dimer and trimer fatty acids, which are formed by epoxidizing the products of the polymerization of $C_{18}$ unsaturated fatty acids such as oleic acid, linoleic acid, linolenic acid, elaidic acid and the like. The use of a dimer or trimer fatty acid entity furnishes a higher molecular weight epoxide that is less likely to volatilize from the finished articles that the polyisocyanate compositions of the present invention are used to produce. The dimer fatty acid may have an acyclic, monocyclic, or bicyclic structure or comprise a mixture of compounds having different such structures.

Epoxidized mono-, di- and triglycerides prepared by epoxidation of the known unsaturated or partially unsaturated glycerides are preferred. The epoxidized glycerides may be prepared from any of the known fatty acid triglycerides available from natural or synthetic sources. The fatty acid group, which is connected to glycerol by an ester bond is usually a $C_6$–$C_{24}$ monocarboxylic acid (linear or branched; saturated, monounsaturated, or polyunsaturated). Such fatty acids and their equivalents are readily available at low cost from natural sources such as edible triglycerides. Specific illustrative fatty acids suitable for use include, but are not limited to, eicosanoic (arachidic) acid, heneicosanoic acid, docosanoic (behenic) acid, elaidic acid, tricosanoic acid, tetracosanoic (lignoceric) acid, caprylic acid, pelargonic acid, capric acid, caproic acid, lauric acid, palmitic acid, stearic acid, oleic acid, cetoleic acid, myristic acid, palmitoleic acid, gadoleic acid, erucic acid, rincinoleic acid, linoleic acid, linolenic acid, myristoleic acid, eleostearic acid, arachidonic acid, or mixtures or hydrogenated derivatives of these acids. The fatty acids may be derived synthetically or from natural sources such as triglyceride lipids. Mixtures of fatty acid entities, such as the mixtures of fatty acids typically obtained by hydrolysis (splitting) of a triglyceride are also suitable. These fatty acid triglycerides include, but are not limited to, fats and oils such as tallow, soybean oil, cottonseed oil, coconut oil, palm kernel oil, corn oil, fish oil, lard, butterfat, olive oil, palm oil, peanut oil, safflower seed oil, cocoa butter, sesame seed oil, rapeseed oil, sunflower seed oil, as well as fully or partially hydrogenated derivatives and mixtures of these triglycerides. Epoxidized linseed oil is particularly preferred.

The mixtures of the present invention are prepared by mixing a) 90% to 99.5%, preferably 95% to 99.5%, more preferably 97% to 99%, most preferably 98% to 99% by weight, based on the combined weight of components a) and b), of a stable, liquid prepolymer of an allophanate-modified diphenylmethane diisocyanate having an NCO content of 5 to 30% as described above; with b) 0.5% to 10%, preferably 0.5% to 5%, more preferably 1% to 3%, most preferably 1.0 to 2.0% by weight, based on the combined weight of components a) and b), of one or more epoxides having an epoxide equivalent weight of 44 to 400.

This invention also relates to a process for the production of polyurethanes/ureas comprising reacting a polyisocyanate component with an isocyanate-reactive component, the improvement wherein the polyisocyanate component comprises the mixture comprising a) 90% to 99.5%, preferably 95% to 99%, more preferably 97% to 99%, most preferably 98% to 99% by weight, based on the combined weight of components a) and b), of a polymethylene poly (phenylisocyanate) blends as described above; with b) 0.5% to 10%, preferably 1% to 5%, more preferably 1% to 3%, most preferably 1.0 to 2.0% by weight, based on the combined weight of components a) and b), of one or more epoxides having an epoxide equivalent weight of 44 to 400.

Suitable isocyanate-reactive components include those known in the field of polyurethane chemistry such as, for example, relatively high molecular weight (i.e., from about 500 to about 6000) polyether polyols, polyester polyols, polythioethers, polyacetals, amine-terminated polyethers, imines, polycarbonates, etc.; and relatively low molecular weight (i.e., 18 to 400) components which may contain hydroxyl and/or amine groups and/or other groups capable of reacting with an NCO group, including water. Low molecular weight components may be crosslinking agents, chain extenders, and/or chain terminators known to those skilled in the art of polyurethane chemistry.

The process of producing polyurethanes/ureas by reacting a polyisocyanate component with an isocyanate-reactive component typically occurs in the presence of one or more catalysts. Suitable catalysts include, for example, organo-metallic catalysts and tertiary amine compounds. The quantity of catalyst necessary is dependent on the acidity of the particular polyisocyanate component used in this process. As the acidity of the polyisocyanate increases, the reactivity of the polyisocyanate decreases. In other words, it takes longer for the reaction to occur unless additional catalyst is added. In order for the reaction to proceed within a specific time period consistently, it is usually necessary to increase or decrease the quantity of catalyst used to achieve constant reactivity profiles using blends of polyisocyanates with various acidity levels. By using the novel mixtures of allophanate-modified MDI prepolymers with epoxides described above in the process of producing polyurethanes/ureas, it is possible to reduce the quantity of catalyst. The reactivity profiles of catalyzed formulations containing these isocyanate blends are significantly more stable, regardless of the acidity level of the polyisocyanate.

It is, of course, also possible that additives may be used in the process of producing polyurethanes/ureas. Suitable additives include, for example, surface-active additives such as emulsifiers and foam stabilizers, blowing agents, cell regulators, flame retarding agents, plasticizers, antioxidants, UV stabilizers, adhesion promoters, dyes, fillers and reinforcing agents such as glass in the form of fibers or flakes or carbon fibers, internal mold release agents, pigments, etc. Usually when pigments are added, they are dispersed in a hydroxyl group containing compound (such as, for example, a polyether, a polyester, or a chain extender). Any of the other known additives typically used in the field of polyurethane/urea chemistry may also be used.

The polyurethanes produced from the mixtures of this invention are suitable for use in areas such as, for example, various types of foams including flexible, semi-rigid, rigid and integral skin foams including reaction injection molding compounds, resin transfer molding compounds, elastomers, adhesives, binders, paints and coatings, etc.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the working examples:

Polyol A: a glycerine/propylene oxide/ethylene oxide adduct terminated with 13% by weight ethylene oxide, and having an OH number of about 28 and a functionality of about 3.

Polyol B: a propylene glycol/propylene oxide/ethylene oxide adduct terminated with 20% by weight of ethylene oxide having an OH number of about 28 and a functionality of about 2.

Polyol C: a propylene glycol/propylene oxide adduct having an OH number of about 56 and a functionality of about 2.

Polyol D: a propylene glycol/propylene oxide adduct having an OH number of about 112 and a functionality of about 2.

Polyol E: Baytec® HC; a polyester polyol mixture having an OH number of about 50 and an average functionality of about 2; commercially available from Bayer AG.

Catalyst A: dibutyl tin dilaurate; commercially available from Air Products as Dabco® T-12.

Catalyst B: a blend of delayed action tin and amine catalysts; commercially available from Air Products as Dabco4D DC-2.

Polyol Blend 1: a mixture of 87.00 parts of Polyol B, 13 parts of diethylene glycol and 0.002 parts of Catalyst A. This mixture had an OH number of about 162 and a functionality of about 2.

Polyol Blend 2: a mixture of 91.32 parts of Polyol E, 8.68 parts of 1,4-butanediol, and 0.006 parts of Catalyst B. This mixture had an OH number of about 154 and a functionality of about 2.

MDI: a mixture of isomers of diphenylmethane diisocyanate containing 98% by weight of 4,4'-diphenylmethane diisocyanate and 2% by weight of 2,4'-diphenylmethane diisocyanate.

Isocyanate A: 100 parts of MDI and 7.76 parts of 1-butanol were charged to a stirred reactor and heated to 60° C. 0.007 part of zinc acetyl-acetonate was added and the stirred reaction mixture was heated to 90° C. After 1.5 hours at 90° C., the NCO content was 22.8%. The reaction mixture was cooled to 60° C., and 0.014 part of benzoyl chloride was added. The product was a clear, light yellow liquid, which was cooled to 25° C. This material had a viscosity of 344 mPa·s at 25° C.

Isocyanate B: This product was produced according to the procedure described under Isocyanate A above, with the exception that only 4.6 parts of 1-butanol was used to result in a final product having an NCO content of 26.8% and a viscosity of 74 mPa·s at 25° C.

Isocyanate C: This product was produced according to the procedure described under Isocyanate A above, with the following exceptions: 4.86 parts of 2-ethyl-1-hexanol was used in place of the 1-butanol to result in a product having an NCO content of 29.0%. To 104.86 parts of this product was added 38.2 parts of Polyol D at 60° C. This reaction mixture was held at 60° C. for 1.5 hours, then cooled to 25° C. The resultant product had an NCO content of 18.5% and a viscosity of 524 mPa·s at 25° C.

Isocyanate D: 100 parts of Isocyanate B were mixed with 16 parts of Polyol A. The mixture was held at 60° C. for 2 hours, then cooled to 25° C. The resultant product had an NCO content of 22.6% and a viscosity of 234 mPa·s at 25° C.

Isocyanate E: This product was produced according to the procedure described under Isocyanate A above, with the following exceptions: only 3.2 parts of 1-butanol were used to yield a product having an NCO content of 29.0%. To 103.2 parts of this product, 44.2 parts of Polyol C were added at 60° C. The reaction mixture was held at 60° C. for 1.5 hours, then cooled to 25° C. The resultant product had an NCO content of 18.3% and a viscosity of 432 mPa·s at 25° C.

Isocyanate F: This product was produced according to the procedure described under Isocyanate A above, with the following exceptions: only 3.2 parts of 1-butanol were used to yield a product having an NCO content of 29.0%.

To 103.2 parts of this product, 48.6 parts of Polyol B were added at 60° C. The reaction mixture was held at 60° C. for 1.5 hours, then cooled to 25° C. The resultant product had an NCO content of 18.2% and a viscosity of 456 mPa·s at 25° C.

Isocyanate G: This product was produced according to the procedure described under Isocyanate F above, with the following exceptions: only 17.5 parts of Polyol B was added to 103.2 parts of the intermediate product which had an NCO content of 29.0%. The reaction mixture was held at 60° C. for 1.5 hours, then cooled to 25° C. The resultant product had an NCO content of 24.2%.

Epoxy A: An epoxidized linseed oil having an epoxide equivalent weight of about 180, commercially available as Epoxol® 9-5 from American Chemical Service, Inc.

Experimental Procedure

First, mixtures of various isocyanate components with Epoxy A were prepared by blending the respective isocyanates with the desired quantity of Epoxy A as set forth in Table A.

TABLE A

Isocyanate/Epoxy Mixtures

| Example | Isocyanate | Epoxy A* |
|---------|------------|----------|
| Mixture 1 | A | 0.0 |
| Mixture 2 | A | 1.0 |
| Mixture 3 | B | 0.0 |
| Mixture 4 | B | 1.0 |
| Mixture 5 | C | 0.0 |
| Mixture 6 | C | 1.0 |
| Mixture 7 | D | 0.0 |
| Mixture 8 | D | 1.0 |
| Mixture 9 | E | 0.0 |
| Mixture 10 | E | 1.0 |
| Mixture 11 | F | 0.0 |
| Mixture 12 | F | 1.0 |
| Mixture 13 | G | 0.0 |
| Mixture 14 | G | 1.0 |

*parts of epoxy per 99.0 parts of Isocyanate

The stability of the NCO content of Isocyanates A through G in Mixtures 1–14 above was measured over a time period of 40 days at 52° C. The results are set forth in Table B below.

TABLE B

NCO Stability of Mixtures 1–14

| Mixture Number | Initial NCO Content[a] | Final NCO Content[b] |
|----------------|------------------------|----------------------|
| Mixture 1 | 22.8% | 22.6 |
| Mixture 2 | 22.8% | 18.0% |
| Mixture 3 | 26.8% | 26.7% |
| Mixture 4 | 26.8% | 20.0% |
| Mixture 5 | 18.5% | 18.3% |
| Mixture 6 | 18.5% | 17.9% |
| Mixture 7 | 22.6% | 22.5% |
| Mixture 8 | 22.6% | 22.5% |
| Mixture 9 | 18.3% | 18.3% |
| Mixture 10 | 18.3% | 17.6% |
| Mixture 11 | 18.2% | 18.1% |
| Mixture 12 | 18.2% | 17.7% |
| Mixture 13 | 24.2% | 24.1% |
| Mixture 14 | 24.2% | 23.7% |

[a]represents NCO content of mixture at 52° C. at 0 days.
[b]represent NCO content of mixture at 52° C. after 40 days.

In Examples 1–4, the respective amounts of polyol and isocyanate (about 150 grams total) to achieve an Isocyanate Index of 105, were placed in an 8 oz. can and mixed for 1 minute at 23° C. After mixing, the jars were placed in a foam insulated 32 oz. can. The temperature and viscosity were monitored until the viscosity reached 100,000 mPa·s. This provided a useful measure of pot life. Results are set forth in Tables 1 and 2. As further illustration of the results, the increase of viscosity vs. time from Tables 1 and 2 is plotted in FIGS. 1 and 2, respectively.

The starting temperature of Polyol Blend 1 in Examples 1 and 2 was 23° C., the starting temperature of Polyol Blend 2 in Examples 3 and 4 was 80° C., and the starting temperature of the Isocyanates in Examples 1–4 was room temperature (i.e., 22°–25° C.).

Table 1 below demonstrates the reactivity of Isocyanate F with no added epoxy (Example 1) and Isocyanate F with 1% epoxy added (Example 2) by showing the respective increases in viscosity and exotherms over time. These results of increases of viscosity vs. time are shown graphically in FIG. 1.

Table 2 demonstrates the reactivity of Isocyanate A with no added epoxy (Example 3) and of Isocyanate A with 2% epoxy added (Example 4) by showing the respective increases in viscosity and exotherms over time. These results of increases of viscosity vs. time are shown graphically in FIG. 2.

TABLE 1

Viscosity Increases and Exotherms Over Time During the Reaction of a Urethane Prepolymer of an Allophanate-Modified MDI With Polyol Blend 1

|  | Example 1 | Example 2 |
|---|---|---|
| Isocyanate F | 40.25 grams | 0.0 grams |
| Isocyanate F w/1% Epoxide A | 0.0 grams | 40.64 grams |
| Polyol Blend 1 | 59.75 grams | 59.36 grams |
| NCO/OH | 1.05 | 1.05 |

| Time (minutes) | Viscosity (mPa · s)/ Exotherm (°C.) | Viscosity (mPa · s)/ Exotherm (°C.) |
|---|---|---|
| 0 | —/23° C. | —/23° C. |
| 2 | 740/27° C. | 750/27° C. |
| 4 | 740/30° C. | 720/32° C. |
| 6 | 750/34° C. | 770/37° C. |
| 8 | 830/37° C. | 910/42° C. |
| 10 | 920/41° C. | 1,100/48° C. |
| 12 | 1,040/45° C. | 1,570/56° C. |
| 14 | 1,240/48° C. | 2,630/62° C. |
| 16 | 1,420/50° C. | 5,800/68° C. |
| 18 | 1,640/52° C. | 20,000/73° C. |
| 20 | 1,920/53° C. | 100,000/78° C. |
| 22 | 2,160/54° C. |  |
| 26 | 2,620/54° C. |  |
| 30 | 3,080/55° C. |  |
| 34 | 3,860/56° C. |  |
| 38 | 4,760/57° C. |  |
| 42 | 7,200/59° C. |  |
| 46 | 26,000/64° C. |  |
| 48 | 78,000/68° C. |  |
| 48.33 | 100,000/69° C. |  |

TABLE 2

Viscosity Increases and Exotherms Over Time During the Reaction of an Allophanate-Modified MDI With Polyol Blend 2

|  | Example 3 | Example 4 |
|---|---|---|
| Isocyanate A | 34.25 grams | 0.0 grams |
| Isocyanate A w/2% Epoxide A | 0.0 grams | 34.70 grams |
| Polyol Blend 2 (grams) | 65.75 grams | 65.30 grams |
| NCO/OH | 1.05 | 1.05 |

TABLE 2-continued

Viscosity Increases and Exotherms Over Time During the
Reaction of an Allophanate-Modified MDI With Polyol Blend 2

| Time (minutes) | Viscosity (mPa · s)/ Exotherm (°C.) | Viscosity (mPa · s)/ Exotherm (°C.) |
|---|---|---|
| 0 | —/— | —/— |
| 2 | 800/74° C. | 900/90° C. |
| 4 | 800/90° C. | 3,050/121° C. |
| 6 | 1,150/103° C. | 47,000/130° C. |
| 6.5 | —/— | 100,000/125° C. |
| 8 | 1,930/105° C. | |
| 10 | 3,530/110° C. | |
| 12 | 6,500/113° C. | |
| 14 | 14,000/114° C. | |
| 16 | 28,600/111° C. | |
| 18 | 61,800/107° C. | |
| 19.5 | 100,000/106° C. | |

The results shown in Tables 1 and 2 indicate that the reactivity of the polyisocyanate blends are enhanced by the addition of a sufficient amount of the epoxide. The reactivity of the isocyanates containing epoxide is higher than the isocyanates without epoxide so that less catalyst is necessary in formulations to subsequently form polyurethanes from them. What is surprising is that only the urethane modified MDI allophanate prepolymer is storage stable (see Table B above).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mixture comprising
A) from 90 to 99.5% by weight, based on the combined weight of components A) and B), of a stable, liquid MDI-based urethane prepolymer having an NCO content of 5 to 30%, and containing an allophanate-modified MDI, wherein said prepolymer comprises the reaction product of:
1) an allophanate-modified MDI having an NCO content of 12 to 32.5%, and being prepared by reacting
a) at least one compound selected from the group consisting of an aliphatic alcohol, an aliphatic diol, an aliphatic triol, an aromatic alcohol, an aromatic diol and mixtures thereof, with
b) diphenylmethane diisocyanate comprising about 0 to 60% by weight of 2,4'-diphenyl-methane diisocyanate, less than 6% by weight of the 2,2'-diphenylmethane diisocyanate, and the balance being 4,4'-diphenylmethane diisocyanate, and
2) an organic compound containing from 2 to 6 hydroxyl groups and having a molecular weight of 76 to 6,000; and
B) from 0.5 to 10% by weight, based on the combined weight of components a) and b), of an epoxide having an epoxide equivalent weight of from about 44 to about 400.

2. The mixture of claim 1, wherein said epoxide has an epoxide equivalent weight of from about 100 to 350.

3. The mixture of claim 1, wherein said epoxide has an epoxide equivalent weight of from about 150 to 300.

4. The mixture of claim 1, wherein said epoxide is an aliphatic epoxide which is free of hydroxyl groups.

5. The mixture of claim 4, wherein said epoxide is epoxidized linseed oil.

6. The mixture of claim 1, wherein component A)1)a) is selected from the group consisting of an aliphatic alcohol having a molecular weight of 32 to 300, an aliphatic diol having a molecular weight of 32 to 300, and mixtures thereof.

7. The mixture of claim 1, wherein component A)2) comprises one or more polyether polyols containing from 2 to 3 hydroxyl groups and having molecular weights of about 1,000 to 5,000.

8. The mixture of claim 1, wherein A) said stable, liquid MDI-based urethane prepolymer has an NCO content of 10 to 29%.

9. The mixture of claim 1, comprising:
A) from 95% to 99% by weight of said stable, liquid MDI-based urethane prepolymer which contains an allophanate-modified MDI, and
B) from 1 to 5% by weight of said epoxide.

10. In a process for the production of a polyurethane/urea by the polyisocyanate polyaddition method of reacting a polyisocyanate component with an isocyanate-reactive component, the improvement wherein said polyisocyanate component comprises the mixture of claim 1.

11. The polyurethane/urea produced by the process of claim 10.

* * * * *